July 5, 1938.   A. WILLIAMS   2,122,630

STEAM SEPARATOR

Filed Jan. 23, 1937

INVENTOR
ARTHUR WILLIAMS.
BY
O. V. Thier
ATTORNEY

Patented July 5, 1938

2,122,630

UNITED STATES PATENT OFFICE 2,122,630

STEAM SEPARATOR

Arthur Williams, Munster, Ind., assignor to The Superheater Company, New York, N. Y.

Application January 23, 1937, Serial No. 122,038

4 Claims. (Cl. 122—491)

The invention relates to separators intended to separate from steam particles of water entrained by it and has particular reference to means for removing from the separator water that has been gathered in it.

In the case of separators for stationary boilers there is no particular difficulty involved in this removal of the water from the separator. It is different however in the case of locomotives with the separator in the dome. Here there is considerable difficulty, and it is the object of the present invention to provide improved means for this purpose.

The invention is described in connection with the accompanying drawing in which Fig. 1 represents a portion of a locomotive equipped with a separator having my improved means;

Figure 1:
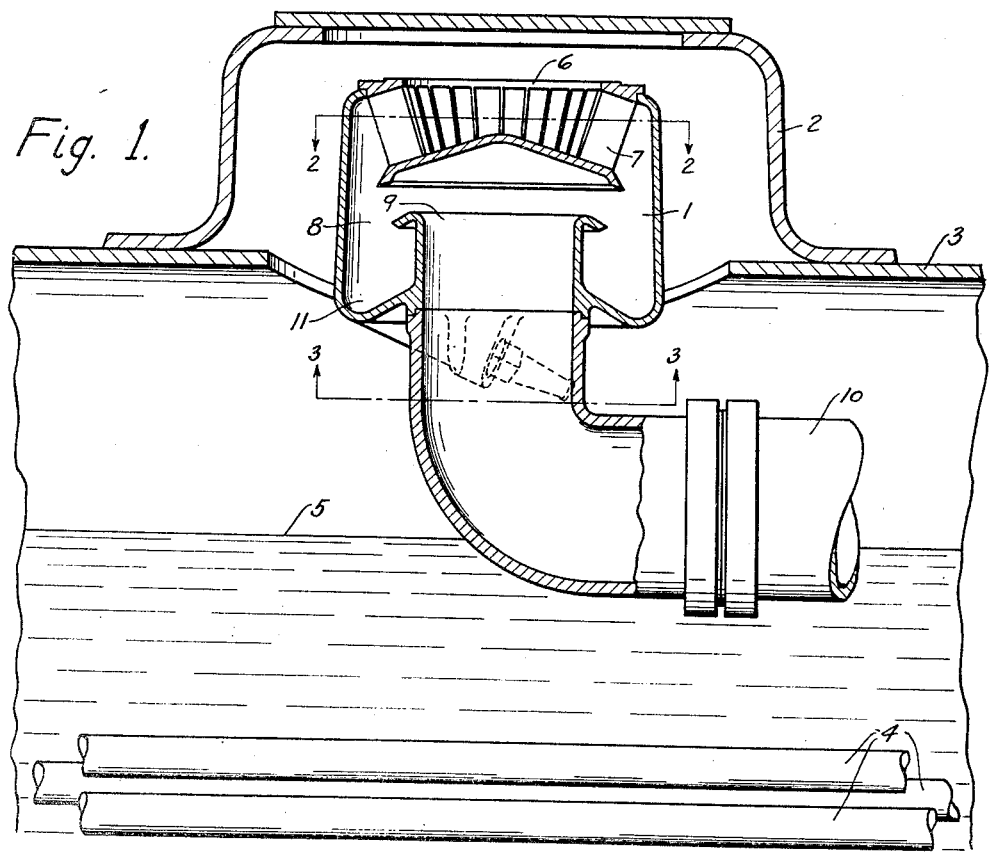
Figure 2:
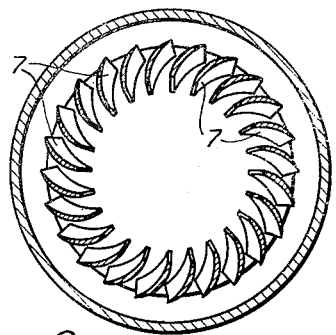
Fig. 2 is a cross-sectional view on line 2—2 of Fig. 1.

The separator, generally shown at 1, is located in the steam dome 2 of a locomotive. The wrapper sheet of the locomotive appears at 3, while at 4 are shown some of the flues. The water level is indicated at 5. Steam enters the separator at 6, passes through the spaces between the plates 7, being given a whirling or rotary motion while doing so and enters the space 8, from which it escapes through the opening 9 into the dry pipe 10 by which it is delivered to the engines, usually by way of a superheater.

No claim is made herein to any features of the separator briefly described above, this being merely one type of separator to which the invention is applicable. The water separated out from the steam by the separator gathers, in this particular form, in the lower part 11 of the separator bowl. It has proved difficult in the past to remove this separated water in a satisfactory manner from the separator and the present invention provides improved means for doing this.

The difficulty mentioned arises principally from the fact that there is only a very slight head available between the point 11 where the water collects and the water level in the boiler. This is often a matter of inches only. The steam in passing through between the plates 7 into the space 8 suffers a slight pressure drop so that the pressure inside of the separator bowl is somewhat lower than that in the steam space and steam dome. This is the situation during normal operation of a locomotive. There are times when this pressure drop may increase many times. This is the situation for example when the engine slips its wheels. At such times there is a very sudden and violent rush of steam through the dry pipe 10 and instantaneously the pressure inside the separator will fall considerably below that present in the steam dome and steam space of the boiler.

There are various places to which the water separated out from the steam can be carried from the separator bowl. It may, for example, be piped to some point outside of the boiler. This would mean, however, that there would be a constant loss of steam blowing out through such pipe unless a trap were used. A trap however introduces an element of danger as it might become inoperative with the result that water would accumulate in the drier and get into the cylinders, wrecking them. The water may be led by means of a pipe into the steam space or to a point in the boiler below the water level. The latter arrangement has the serious objection that there is danger that when the pressure within the separator casing drops to a point considerably below the boiler pressure, water would be forced up into the separator and might well reach the opening 9 and so get into the valve chest and engine. For this reason, piping to a point below the water level is inadmissible. A check in such a line might be thought to remedy this but such checks are never reliable and such a check might not close, thereby endangering the engine as stated.

The safest and most convenient arrangement is to lead the water out through one or more ducts directly into the steam space and this is the arrangement contemplated by the present invention.

If there is a considerable amount of water carried into the separator by the steam and there separated out and allowed to collect in the bowl, building up a slight head, such water will under the pressure of this head flow freely into the steam space. This would be entirely satisfactory. It has been found, however, that with a fairly large sized tube or duct from the separator bowl to the steam space there would be times when insufficient water collects in the bowl to fill the tube entirely and in that case the pressure differential between the inside and outside of the separator will cause a flow of steam inward through the duct. This steam flow whips up the surface of the water that is flowing out without filling the pipe completely and carries it along back to join the steam flowing through opening 9 into dry pipe 10. The action of the separator is thereby wholly undone.

Figure 4:
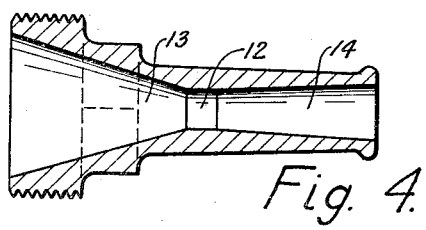
Fig. 4 is an enlarged sectional view on line 4—4 of Fig. 3.

A remedy has been suggested for this which is to restrict the outer end of the duct. This has a beneficial effect. At times such as spoken of, i. e. when there is insufficient water to fill the pipe and steam flows inward through the duct as described, this steam may pick up some water on its way through the restricted outlet but on expanding in the larger portion of the duct it again drops this water. The result therefore is quite satisfactory as far as the operation of the separator under such conditions is concerned. It is now found, however, that with an outlet end or nozzle of this form, the restriction at the outer end of the duct interferes with the delivery of water when there is a considerable amount separated out. The restriction introduces a resistance such that the head to which the water has to build up before it is discharged at the proper rate through the orifice becomes dangerously high, and water may flow over into dry pipe 10. To remedy this I give the outlet end or nozzle of the duct the form shown on an enlarged scale in Fig. 4. The most restricted part of the nozzle is shown at 12. It is reduced down to this minimum diameter gradually as indicated at the cone 13 and is then again flared toward the outlet end as indicated at 14, the entire outlet nozzle or tip having therefore the form of a Venturi tube. With this form of outlet nozzle it is found that the flow at times when there is a large amount of water to be discharged is freer than if the outward flare 14 were absent. The head required in space 8 to complete a given amount of flow is therefore reduced. On the other hand the restriction 12 has the same beneficial effect in case the water separated out does not fill the tube at this smallest cross section as was described above, i. e. the steam flowing inward above the surface of the flowing water may pick up some of the water at those points but will drop it again on expanding in the flaring portion 13.

Figure 3:
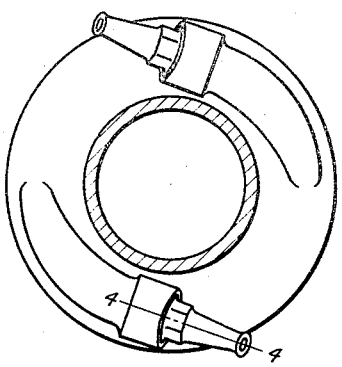
Fig. 3 is a section on line 3—3 of Fig. 1.

In the particular form of the invention illustrated in the drawing there are, as will be seen particularly in Fig. 3, two outlet ducts and two nozzles. In some cases one may be sufficient and in others a larger number than two may be found beneficial. In each case the outlet nozzle is given the shape shown in longitudinal section in Fig. 4.

It will be obvious that the particular form of separator is rather immaterial, but that on the contrary the invention has application to separators of other forms in which, however, there is a drop in pressure as the steam flows through them. This is of course invariably the case.

What I claim is:

1. In a separator so placed with relation to a boiler and so connected to it that steam from the boiler on its way to the point of use flows through the separator and the water separated out by the separator is delivered through a duct to the steam space of the boiler, a nozzle at the outlet of said duct, said nozzle having the shape of a Venturi tube.

2. Apparatus according to claim 1, said duct being of substantially uniform cross-sectional area, and said nozzle having at its inlet substantially the same area, its smallest cross-sectional area being no more than one-tenth of its largest cross-sectional area.

3. Apparatus according to claim 1, said nozzle having a cross-sectional area at its most restricted point not greater than one-tenth of its largest cross-sectional area.

4. Apparatus according to claim 1, the flare from the smallest area of the Venturi nozzle to the outlet end being such that enough kinetic energy is changed into static pressure to cause the water which is separated out to flow into the steam space.

ARTHUR WILLIAMS.